United States Patent [19]
Marsh et al.

[11] Patent Number: 5,995,017
[45] Date of Patent: *Nov. 30, 1999

[54] ELECTRONIC IDENTIFICATION SYSTEM CONFIRMING VALID CODE

[75] Inventors: Michael John Camille Marsh; Andrzej Lenarcik, both of Johannesburg, South Africa

[73] Assignee: BTG International Limited, London, United Kingdom

[*] Notice: This patent is subject to a terminal disclaimer.

[21] Appl. No.: 08/976,949

[22] Filed: Nov. 24, 1997

Related U.S. Application Data

[63] Continuation of application No. 08/581,791, Jan. 2, 1996, abandoned, which is a continuation of application No. 07/816,893, Jan. 3, 1992, Pat. No. 5,537,105.

[30] Foreign Application Priority Data

Jan. 4, 1991 [ZA] South Africa ............................ 91/0078
Jul. 22, 1991 [ZA] South Africa ............................ 91/5733

[51] Int. Cl.⁶ ................................ H04Q 7/00; G07C 9/00
[52] U.S. Cl. .............................. 340/825.54; 340/825.34
[58] Field of Search ............................. 340/825.54, 825.5, 340/825.34, 825.52, 572, 568, 505; 342/44, 45, 51, 42, 43

[56] References Cited

U.S. PATENT DOCUMENTS

| | | | |
|---|---|---|---|
| 3,981,011 | 9/1976 | Bell | 342/44 |
| 4,075,632 | 2/1978 | Baldwin . | |
| 4,144,534 | 3/1979 | Prickett et al. | 342/43 |
| 4,308,530 | 12/1981 | Kip et al. . | |
| 4,495,496 | 1/1985 | Miller, III | 340/825.54 |
| 4,614,945 | 9/1986 | Brunius et al. . | |
| 4,631,708 | 12/1986 | Wood et al. . | |
| 4,673,932 | 6/1987 | Ekchian et al. . | |
| 4,680,583 | 7/1987 | Grover | 340/825.52 |

(List continued on next page.)

FOREIGN PATENT DOCUMENTS

| | | |
|---|---|---|
| 0161779 | 11/1985 | European Pat. Off. . |
| 0285419 | 10/1988 | European Pat. Off. . |
| 323 011 A2 | 11/1988 | European Pat. Off. . |
| 0301127 | 2/1989 | European Pat. Off. . |
| 0405695 | 1/1991 | European Pat. Off. . |
| 467036 | 1/1992 | European Pat. Off. . |
| 494114 | 7/1992 | European Pat. Off. . |
| 21 01 879 | 7/1972 | Germany . |
| 2354067 | 5/1975 | Germany . |
| 85/6178 | 8/1985 | South Africa . |
| 92/0039 | 1/1992 | South Africa . |
| 93/6267 | 8/1993 | South Africa . |
| 2116808 | 9/1983 | United Kingdom . |
| 2 152 335 | 7/1985 | United Kingdom . |
| 2 191 368 | 12/1987 | United Kingdom . |
| WO 82/00910 | 3/1982 | WIPO . |
| 90/00785 | 1/1990 | WIPO . |
| 90/15343 | 12/1990 | WIPO . |
| WO 90/16051 | 12/1990 | WIPO . |
| WO 91/13415 | 9/1991 | WIPO . |

*Primary Examiner*—Edwin C. Holloway, III
*Attorney, Agent, or Firm*—Pillsbury Madison & Sutro LLP

[57] ABSTRACT

An identification system having an interrogator and a number of transponders. The interrogator includes a transmitter for transmitting an interrogation signal to the transponder, and a receiver for receiving a response signal from the transponder. A micro-processor identifies the transponder from data in the response signal. Each transponder includes a receiving antenna for receiving the interrogation signal, a code generator, a transmitting antenna, and a modulator connected to the code generator. On receipt of the interrogation signal the transponder repeatedly transmits a response signal containing data which identifies the transponder. The interrogator detects successful identification of any transponder and briefly interrupts the interrogation signal to indicate the successful identification. Each transponder includes a logic circuit responsive to a respective interruption in the interrogation signal to cease transmission of its own response signal.

25 Claims, 13 Drawing Sheets

U.S. PATENT DOCUMENTS

| | | |
|---|---|---|
| 4,691,202 | 9/1987 | Denne et al. . |
| 4,710,752 | 12/1987 | Cordery . |
| 4,818,998 | 4/1989 | Aspell ........................................ 342/44 |
| 4,827,110 | 5/1989 | Rossi ....................................... 235/376 |
| 4,862,160 | 8/1989 | Ekchian et al. . |
| 4,862,176 | 8/1989 | Voles ........................................ 342/45 |
| 4,870,391 | 9/1989 | Cooper . |
| 5,008,661 | 4/1991 | Raj ..................................... 340/825.54 |
| 5,036,308 | 7/1991 | March . |
| 5,081,458 | 1/1992 | Meunier . |
| 5,103,222 | 4/1992 | Hogen Esch et al. . |
| 5,105,190 | 4/1992 | Kip et al. . |
| 5,124,699 | 6/1992 | Tervoert et al. . |
| 5,150,114 | 9/1992 | Johansson . |
| 5,151,684 | 9/1992 | Johnsen . |
| 5,218,343 | 6/1993 | Stobbe et al. . |
| 5,221,831 | 6/1993 | Geiszler . |
| 5,239,167 | 8/1993 | Kipp . |
| 5,260,690 | 11/1993 | Mann et al. . |
| 5,381,137 | 1/1995 | Ghaem et al. . |
| 5,387,900 | 2/1995 | Plonsky et al. . |
| 5,519,381 | 5/1996 | Marsh ...................................... 340/572 |

WAVEFORMS WITH GAP DETECTION AND SYNCHRONIZATION

FIG. 13

WAVEFORMS WITH NO GAP DETECTION OR SYNCHRONIZATION

| SB | SA | Max. slots between transmissions |
|---|---|---|
| 0 | 0 | 0 |
| 0 | 1 | 16 |
| 1 | 0 | 128 |
| 1 | 1 | 1024 |

FIG. 14

ELECTRONIC IDENTIFICATION SYSTEM CONFIRMING VALID CODE

This is a continuation of application 08/581,791 filed on Jan. 2, 1996, now abandoned, which is a continuation of application 07/816,893, filed on Jan. 3, 1992, and issued on Jul. 16, 1996 as U.S. Pat. No. 5,537,105.

BACKGROUND OF THE INVENTION

This invention relates to an identification system comprising an interrogator and a plurality of transponders.

Interrogator/transponder systems have been used for identifying vehicles, animals, people and other objects. Such systems generally comprise an interrogator comprising a transmitter/receiver and a transponder attached to each object to be identified. The transponder carries a code which uniquely identifies the object in question. Systems of this kind can usually only deal effectively with one transponder at a time. Attempts to mass-produce low cost transponders have generally not been successful, due to the requirement for relatively expensive frequency-critical components in the transponder.

It is an object of the invention to provide transponders which can be produced at a relatively low cost, and an identification system employing such transponders.

SUMMARY OF THE INVENTION

According to the invention there is provided an identification system comprising an interrogator and a plurality of transponders, the interrogator including transmitter means for transmitting an interrogation signal to the transponder, receiver means for receiving a response signal from the transponder, and processor means for identifying the transponder from data in the response signal; each transponder comprising a receiving antenna for receiving the interrogation signal, a code generator, a transmitting antenna, and a modulator connected to the code generator, so that on receipt of the interrogation signal the transponder transmits a response signal containing data which identifies the transponder, the transponder being adapted to repeat the transmission of the response signal to increase the probability of successful reception thereof by the interrogator.

Preferably, the interrogator is adapted to detect successful identification of any transponder and to modify the interrogation signal to indicate the successful identification, each transponder including means responsive to a respective modification of the interrogation signal to cease transmission of its response signal.

The interrogator may be adapted to interrupt the interrogation signal for a predetermined period after successfully identifying a particular transponder, that transponder in turn being adapted to sense the interruption in the interrogation signal and to cease transmission of its response signal in response thereto.

The invention extends to a transponder for use with the identification system, the transponder comprising a receiving antenna for receiving the interrogation signal, a code generator, a transmitting antenna, and a modulator connected to the code generator, the transponder being adapted to transmit a response signal containing data which identifies the transponder, the transponder including control means arranged to cause repeated transmission of the response signal to increase the probability of successful reception thereof by the interrogator.

The control means may be responsive to a respective modification of the interrogation signal to cease transmission of the response signal.

Preferably, the control means is arranged to monitor the received interrogation signal and to disable the modulator on receipt of a predetermined confirmation signal from the interrogator which is received after successful reception of the response signal by the interrogator.

In one version of the transponder th e modulator is arranged to divert a portion of the energy of the received interrogation signal to the transmitting antenna, so that on receipt of the interrogation signal, the transponder transmits a response signal comprising a carrier derived from the interrogation signal which is modulated by the output of the code generator.

DESCRIPTION OF EMBODIMENTS

Figure 1:
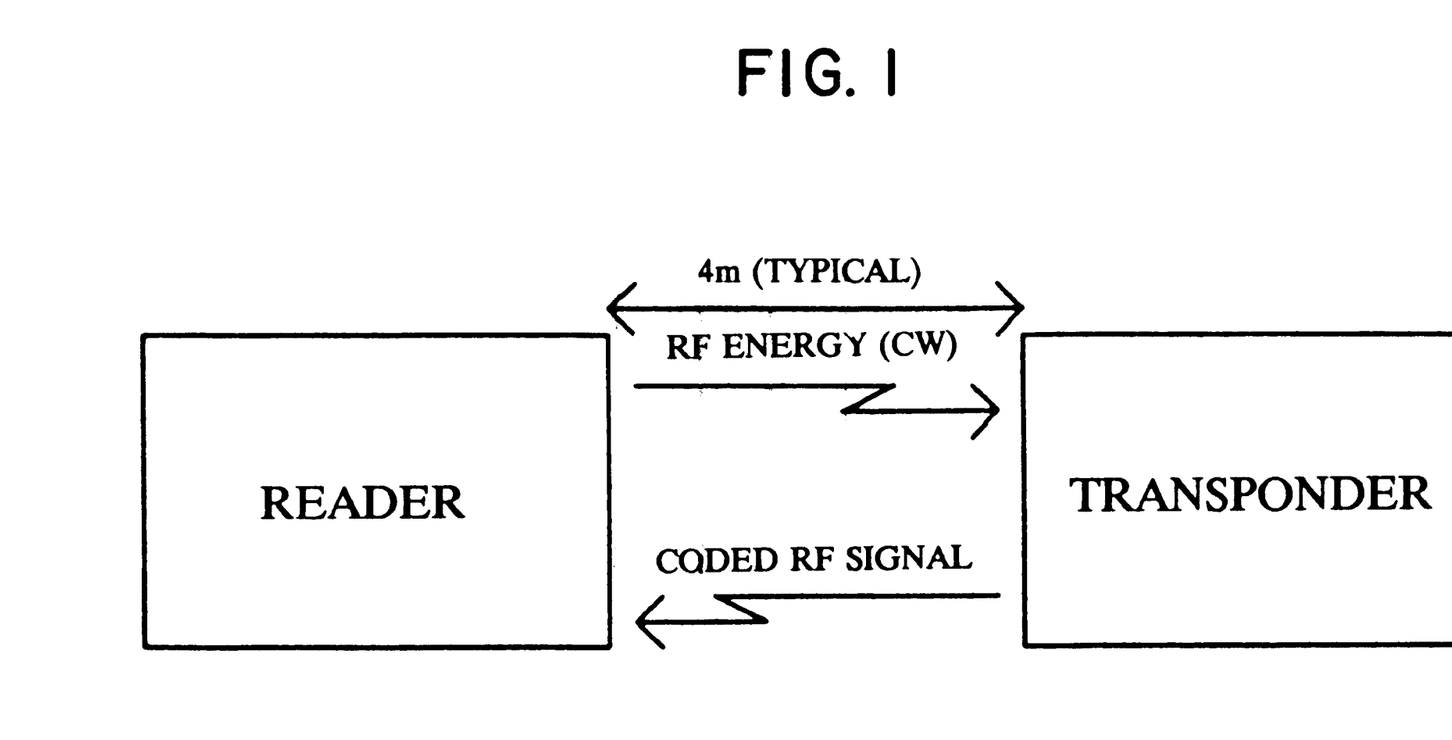
FIG. 1 is a simplified block diagram showing an interrogator (reader) and a transponder according to the invention.
Figure 2:
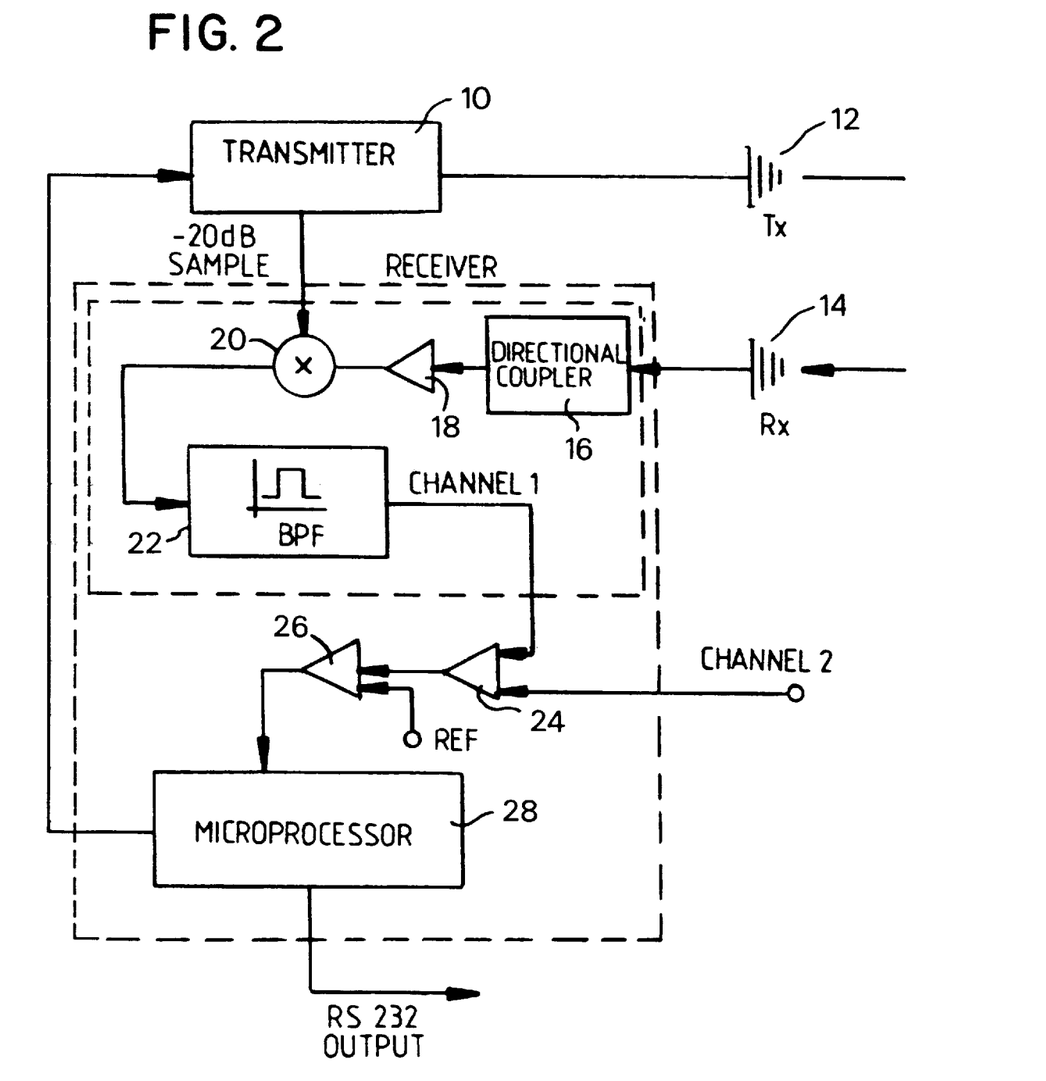
FIG. 2 is a simplified block diagram of the interrogator of FIG. 1.

FIG. 1 illustrates, in a very simplified form, an interrogator (reader) 2 interacting with a transponder 4 according to the invention. FIG. 2 illustrates the basic circuitry of the interrogator in greater detail.

The interrogator 2 includes a transmitter 10 which transmits a 915 MHz interrogation signal at a power of approximately 15 W via a transmitting antenna 12. The transponder 4 receives the interrogation signal and responds with a much weaker response signal at the same frequency, which is modulated with a code identifying the transponder and thus the object with which the transponder is associated. (Operation of the transponder is described below.)

Figure 3:
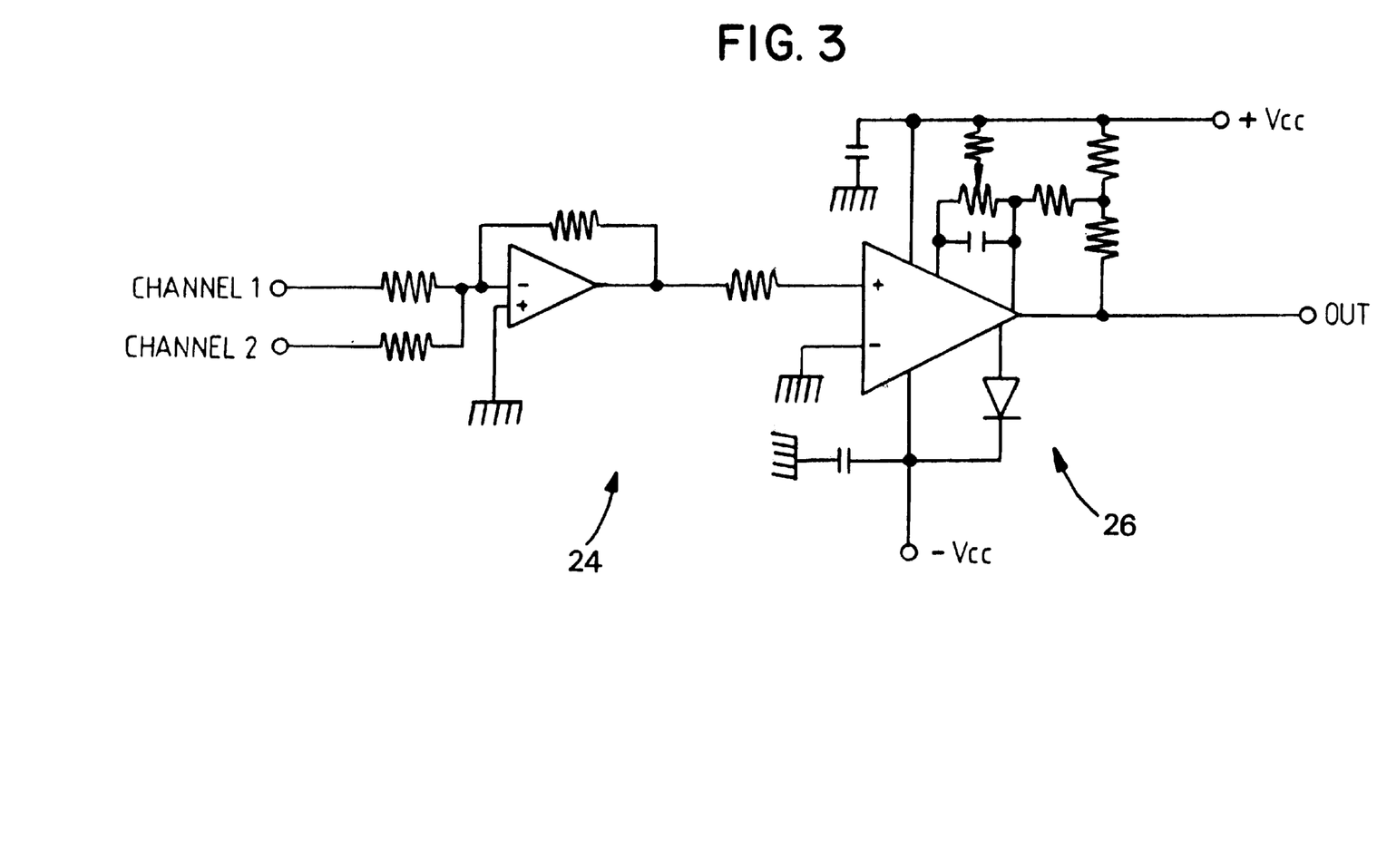
FIG. 3 is a schematic diagram of the amplifier and comparator of the interrogator of FIGS. 1 and 2.

The response signal from the transponder 4 is received by a receiving antenna 14 of the interrogator 2 and passed through a microstrip directional coupler 16, which attenuates excessively strong received signals, to an amplifier 18, before being fed to a mixer 20. The received signal has a carrier frequency which is the same as the transmitting frequency of the interrogator 2. The amplified received signal is mixed with a reference sample from the transmitter 10, and the resulting low frequency output is passed through a bandpass filter 22 and thence to an amplifier 24 and a comparator or threshold detector 26. The comparator squares the amplified output of the bandpass filter, so that its output is a digitally compatible output waveform containing the code transmitted by the transponder. One possible embodiment of a circuit block including the amplifier 24 and the comparator 26 is shown in FIG. 3. This output signal is fed to a microprocessor 28 which analyses the received code and checks its validity using conventional circular redundancy checking systems, before outputting the code for further processing.

It will be noted that the amplifier has a second input for use with a second receiver channel. This input is for use in a version of the transponder 4 with a spatial diversity antenna arrangement, in which two otherwise identical receiving antennas are spaced apart by one half wavelength. This ensures that if one antenna does not receive the interrogation signal adequately strongly, due for example to standing wave effects or the like, the second antenna will receive the interrogation signal. This improves the reliability of operation of the transponder system.

The microprocessor 28 is arranged to control the transmitter 10 to interrupt the output of the transmitter immediately after receipt of a valid identification code from a transponder. For example, immediately after receipt of a valid transmission from any transponder 4, the microprocessor shuts off the transmitter 10 for a brief period, say one millisecond.

Figure 4:
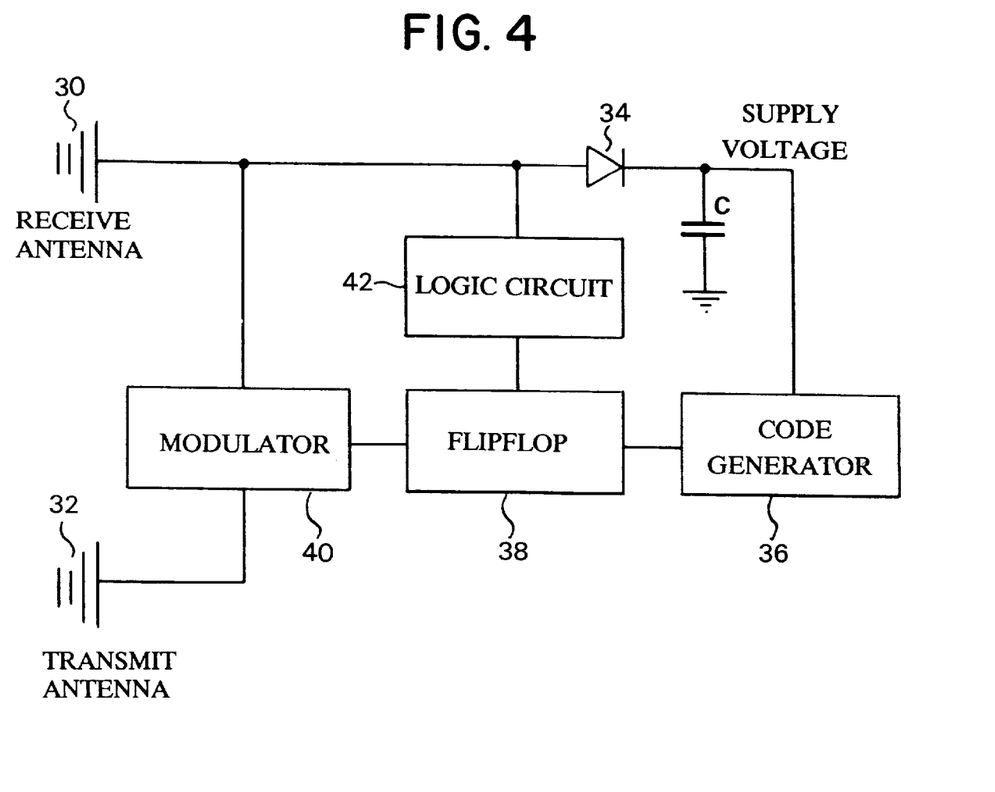
FIG. 4 is a block diagram of a transponder according to the invention.

FIG. 4 illustrates the transponder 4 itself. The transponder 4 includes a receiving antenna 30 and a transmitting antenna 32 which are typically defined by a printed circuit. The antennas 30 and 32 are cross polarised to minimise crosstalk. The receiving antenna is connected via a diode 34 to a charge storage device in the form of a capacitor C, which stores a portion of the energy of the interrogation signal received by the receiving antenna. When the capacitor C has charged sufficiently, it enables an integrated circuit code generator 36, which is pre-programmed with a unique code which is transmitted three times at approximately 1200 baud. The output signal from the code generator is fed via a flipflop 38 to a modulator 40 which re-directs a portion of the energy received via the receiving antenna 30 to the transmitting antenna 32. The flipflop 38 is controlled by a logic circuit 42.

Because the modulator 40 uses the received interrogation signal as the transmitter source for its output carrier signal, no frequency critical components are required, as would be the case with an actively powered transmitter and modulator circuit. Thus, the transponder 4 can comprise a circuit board on which the receiving and transmitting antennas 30 and 32 are printed, together with one or more integrated circuits providing charge storage, code generation and modulating functions. It is also possible to combine the transmitting and receiving antennas in a single antenna. The modulator 40 is typically a diode which is reverse biased and which is biased into a conducting mode by pulses from the code generator to allow energy transfer from the receiving antenna 30 to the transmitting antenna 32.

Obviously, the receiving antenna 14 of the interrogator receives a strong component of the interrogation signal transmitted by its transmitting antenna 12. However, in view of the fact that mixing of two identical frequency components gives a DC component in the mixer, it is a relatively simple matter to remove this component by means of the bandpass filter 22, so that the received code is not contaminated. Thus, simultaneous transmission and reception on the same frequency is possible, as well as the use of a highly simplified transponder circuit.

In an alternative version of the transponder 4, the transponder 4 is provided with its own power supply, such as a battery, and can therefore use an input amplifier to improve its sensitivity. This allows the interrogator 2 to transmit at a significantly lower power, for example, at 100 mW instead of 15 W. This is because the interrogation signal does not need to contain sufficient energy to power the transponder in this application. A transmitting power of 100 mW has been found to be adequate for a reading distance of 4 m. However, the embodiment illustrated in FIG. 4 is particularly advantageous, due to its compatibility with ultra low cost mass production techniques, which facilitates multiple article identification as described below.

When the interrogator 2 receives response signals from several transponders 4 which have been interrogated at the same time, it will occur from time to time that two or more transponders 4 are transmitting during the same period, notwithstanding the fact that there is a random or pseudo-random delay between transmissions from each transponder 4, so that the transponders effectively "jam" each other. This will generally prevent correct reception of the code transmitted by either transponder. However, provided that the codes transmitted by the transponders are fixed in length and include error correction bits, such as CRC code 5 (See FIGS. 8 and 9), it is possible for the interrogator 2 to confirm whether or not it has received a valid code. As mentioned above, as soon as a code is validly received, the interrogation signal is interrupted briefly, for a period shorter than the length of a transponder transmission.

The logic circuit 42 in each transponder 4 monitors the presence of the interrogation signal at the output of the receiving antenna 30. As soon as the logic circuit detects the interruption in the interrogation signal following on the completion of the last transmission by the transponder 4, the flipflop 38 is set, disabling the modulator 40 and thus stopping the transmission from that transponder.

Figure 5:
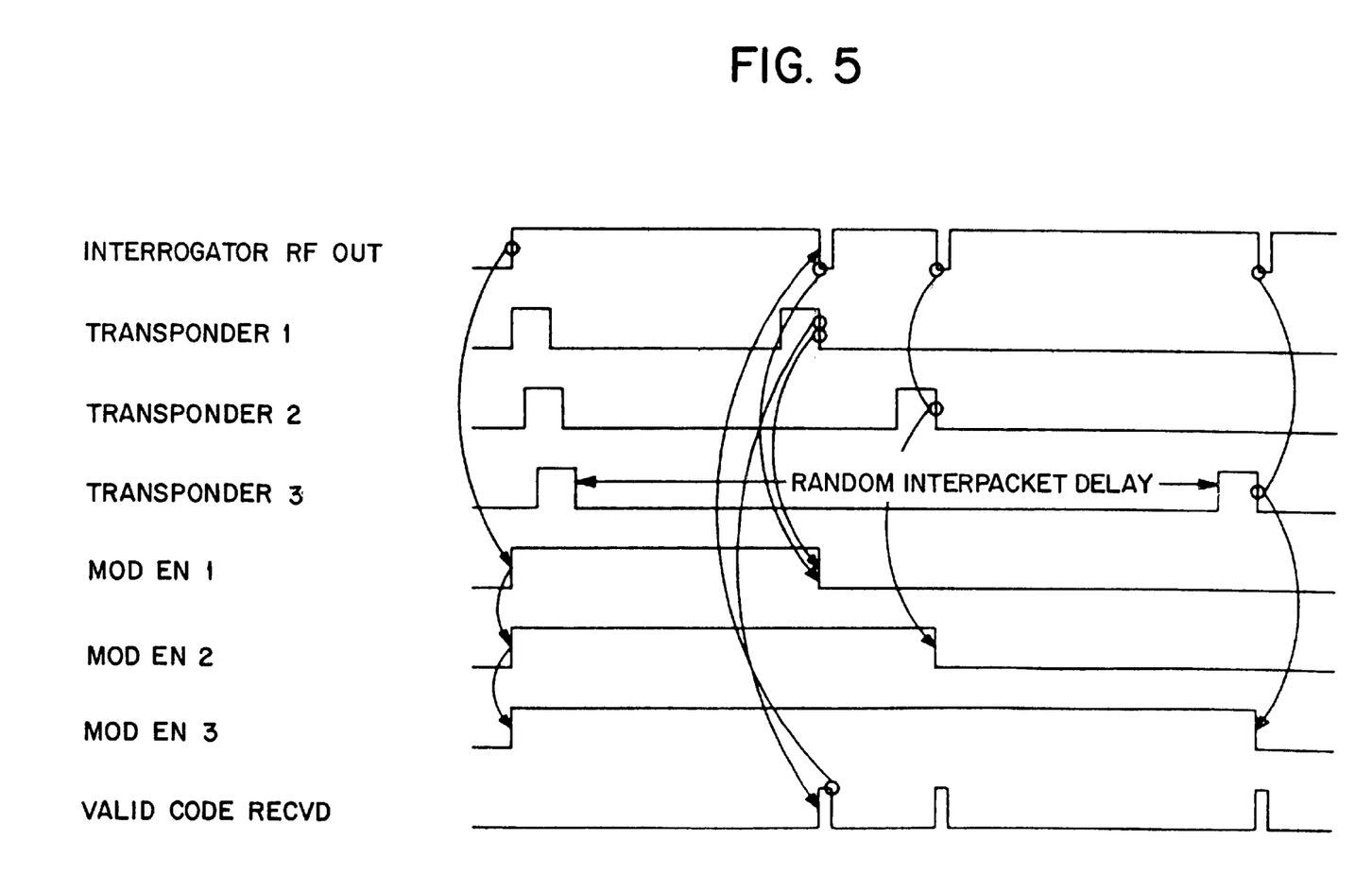
FIG. 5 is a timing diagram illustrating the operation of the interrogator and three transponders.
Figure 6:
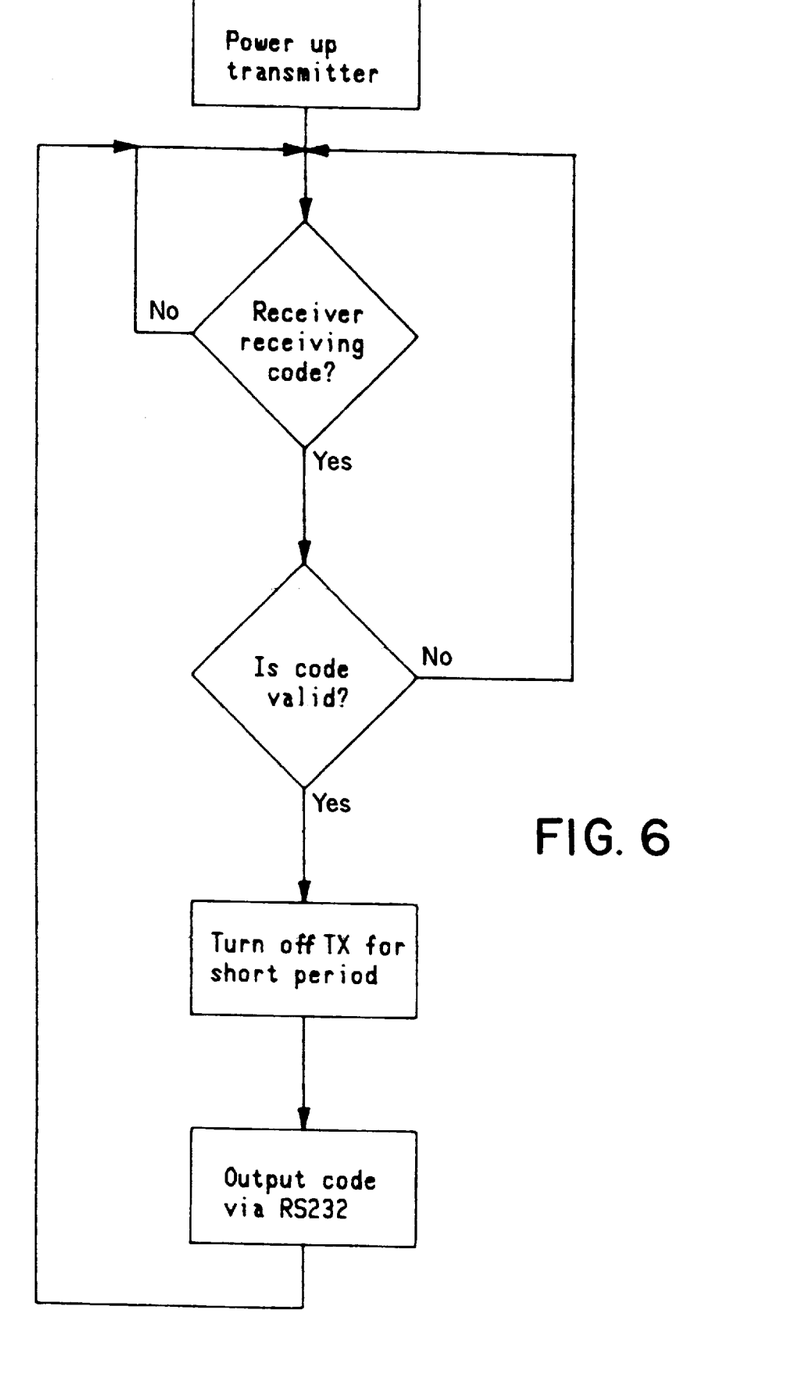
FIG. 6 is a simplified flow chart illustrating the operation of the interrogator.
Figure 7:
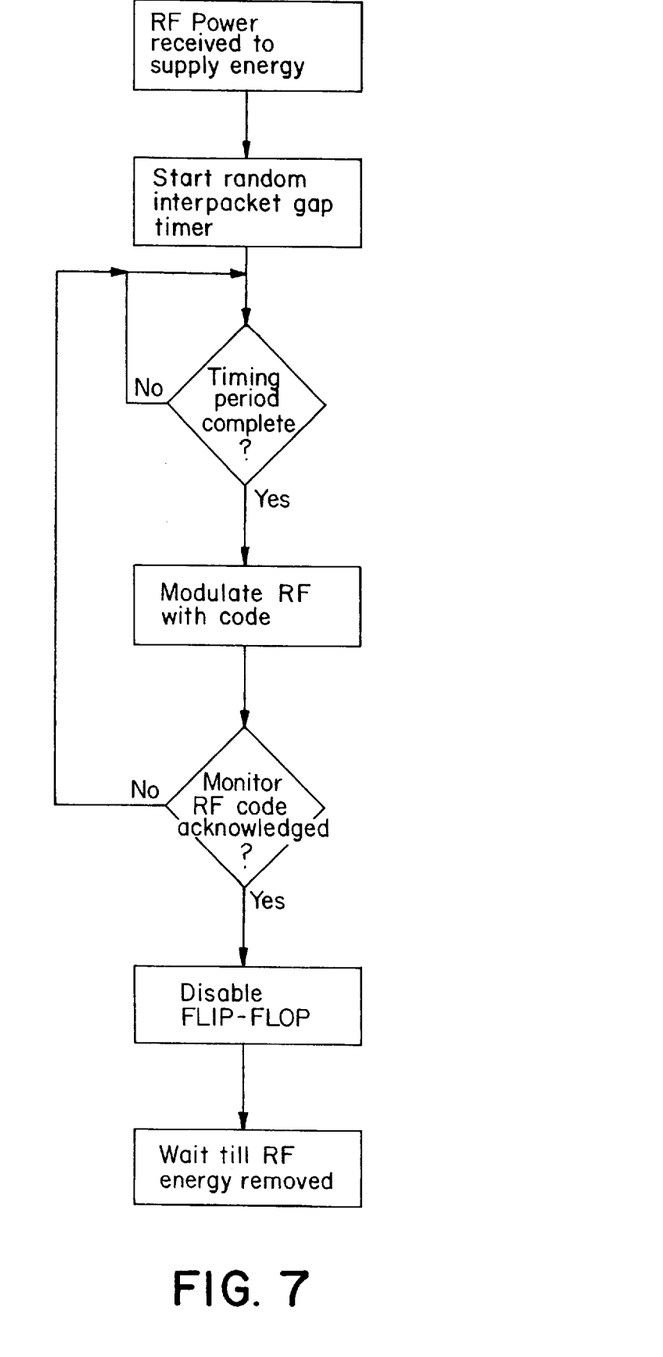
FIG. 7 is a simplified flow chart illustrating the operation of each transponder.

The timing diagram of FIG. 5 illustrates the interaction of the interrogator 2 and three transponders 4, while the flow charts of FIGS. 6 and 7 illustrate the sequence of operation of the interrogator (I1–I5) and the transponders (T1–T7), respectively.

The effect of the above arrangement is that each transponder 4 ceases to transmit as soon as it has successfully transmitted its identification code to the interrogator 2. As each transponder shuts down, more interference-free time is created within which other transponders in a group of such transponders can transmit their signals to the interrogator. This process continues until all of the transponders have successfully transmitted their identification code to the interrogator. The microprocessor can count the number of transponders identified.

Assuming that all transponders 4 have the same identification code, it is thus possible for the interrogator 2 to count the number of transponders 4, which respond to the interrogation signal in a particular time period. For example, a large number of identical articles can each be provided with a transponder, all the transponders having the same identification code, and a portable interrogator unit can be used to count the articles. This can be done, for example, in a warehouse or other storage area, and obviates the necessity for physically counting stock. The transponders 4 can be fitted to individual articles, or to containers such as boxes, each of which contains a known number of articles. It will be appreciated that it is not even necessary for the articles which are fitted with transponders 4 to be visible for them to be counted in this way. Conveniently, the antennas 30 and 32 (or a single dual-purpose antenna) can be printed on a surface of the container using conductive ink, while the electronic circuitry of the transponder is secured to the surface in electrical contact with the antenna(s). Such an embodiment can be produced very inexpensively using the passive transponder 4 embodiment described above, making it possible to use the transponders in an automatic stock control system for relatively low cost articles.

Because of the low cost of the passive transponders 4, it is proposed, eventually, that a transponder can be attached to each item of stock in a supermarket, for example, so that a trolley full of groceries can be scanned automatically by an interrogator 2 located at a till, without any handling of the goods by a cashier being required. This is possible because the invention makes it possible both to identify each item in a group of different items, as well as to count the number of each type of item present. Obviously, the cost of the transponders 4 would determine the value of the articles to which they can viably be applied. However, with present day technology, the transponders 4 can be produced at a cost low enough for them to be used economically with medium-priced articles such as domestic appliances, applied to disposable packaging.

In a further development of the invention, the interrogation signal can be modulated intermittently with a code signal corresponding to the identity of one or more transponders, or a designated class of transponders 4, which are being sought. The logic circuit 42 of each transponder 4 then checks the transmitted code in the interrogation signal, and activates the transponder only if it is one of those transponders corresponding to the transmitted code. Other transponders remain disabled. Once all transponders in a particular category have been identified and/or counted, the interrogation signal is removed to allow the charge storage device in the transponders to discharge, and the code in the interrogation signal is then be changed to allow a new category of transponders to be interrogated.

Figure 8:
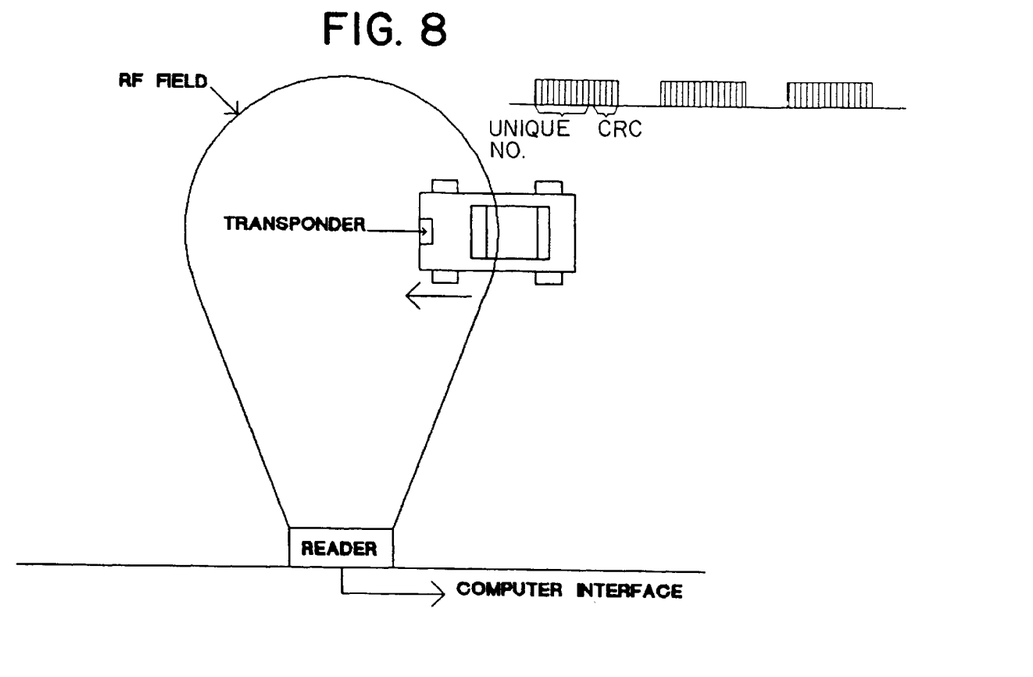
FIGS. 8 and 9 are schematic illustrations of two applications of the invention.
Figure 9:
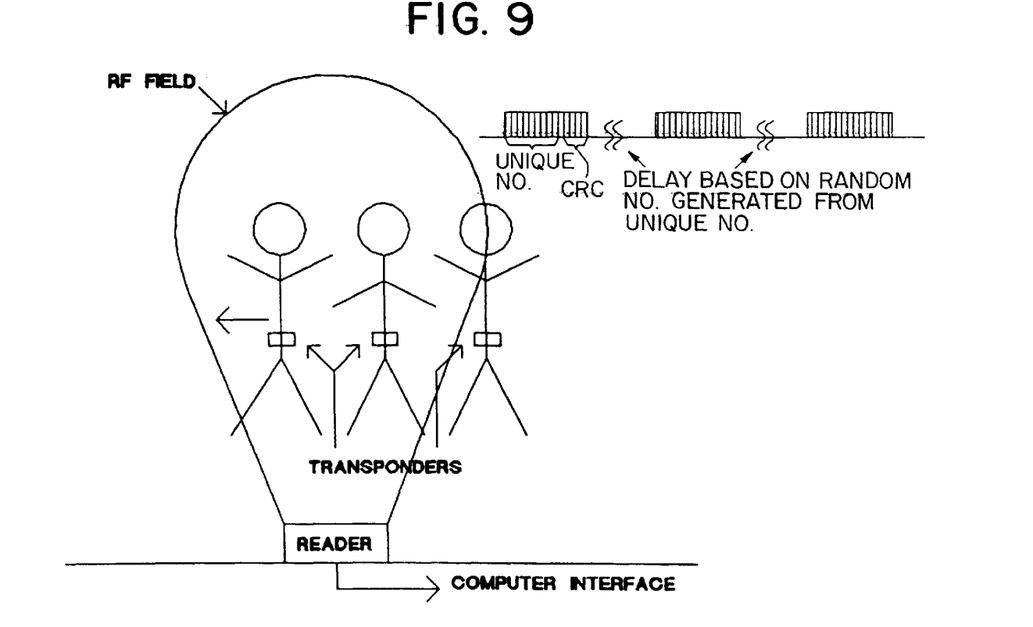

Two further applications of the transponder are schematically illustrated in FIGS. 8 and 9. The application illustrated in FIG. 8 is for vehicle identification, where one vehicle 43 or several vehicles can be identified at a time. In the application illustrated schematically in FIG. 9, the system is used to identify the members of a group of people 44, 45, 46, who may pass the interrogator simultaneously. In conventional systems, simultaneous interrogation of a number of transponders would result in simultaneous transmission from the transponders 4, making it impossible to read the transmitted data. However, the code generator 36 of each transponder 4 transmits its unique code 6 three times, with a spacing between transmissions which is pseudo-randomly determined based on the identification code of that transponder itself. This assists in allowing each transponder to have a "quiet time" when it is the only unit radiating.

Another application for the transponders is in identifying personnel, as shown in FIG. 9. Tests have been conducted in which transponders according to the invention were fitted to the battery boxes of miner's cap lamps. In this case, powered versions of the transponders were used, due to the ready availability of battery power. Interrogators are placed at desired locations, for example at the entrances to mine haulages or stopes, and can count personnel entering demarcated areas, as well as identifying each person individually. The individual interrogators are connected to a central computer, which can monitor the movement of personnel in the mine, and which can generate a map or other display, if required, indicating the location of each individual. This is particularly useful in emergencies, allowing rescue parties to know how many individuals are trapped in a certain area after a rock fail, for example. A prototype system, employing a 915 MHz interrogation signal of 15 W, can effectively read transponders in the form of badges the size of a credit card at a distance of approximately 4 m. 64 bit identification codes were used in the prototype, allowing a large number of uniquely identified transponders to be provided. A prototype of the transponder was developed using two custom made integrated circuits IC1(50) and IC2(52). The first integrated circuit, IC1(50), is designated type CLA 61061 and is a CMOS Manchester encoder with a pseudo random delay function. This device is designed for the serial transmission of either a 64 bit or a 128 bit word in Manchester II format, at pseudo random intervals. The chip also provides addressing for a memory device in which the word to be transmitted (that is, the identification code) is stored, and logic control of the timing sequence of operation.

The integrated circuit IC2 52 is designated type */047 and comprises a bipolar analogue PROM, an oscillator, and a power-on-reset circuit on a single chip. The chip also includes a "gap detector" circuit and circuitry for rectifying and modulating an RF carrier. The RF circuitry can be bypassed in part or completely, to make use of special high frequency rectifying diodes. The PROM is a 64 bit memory implemented with aluminium fuses which are selectively blown before packaging of the chip, to store a selected identification code.

Figure 10:
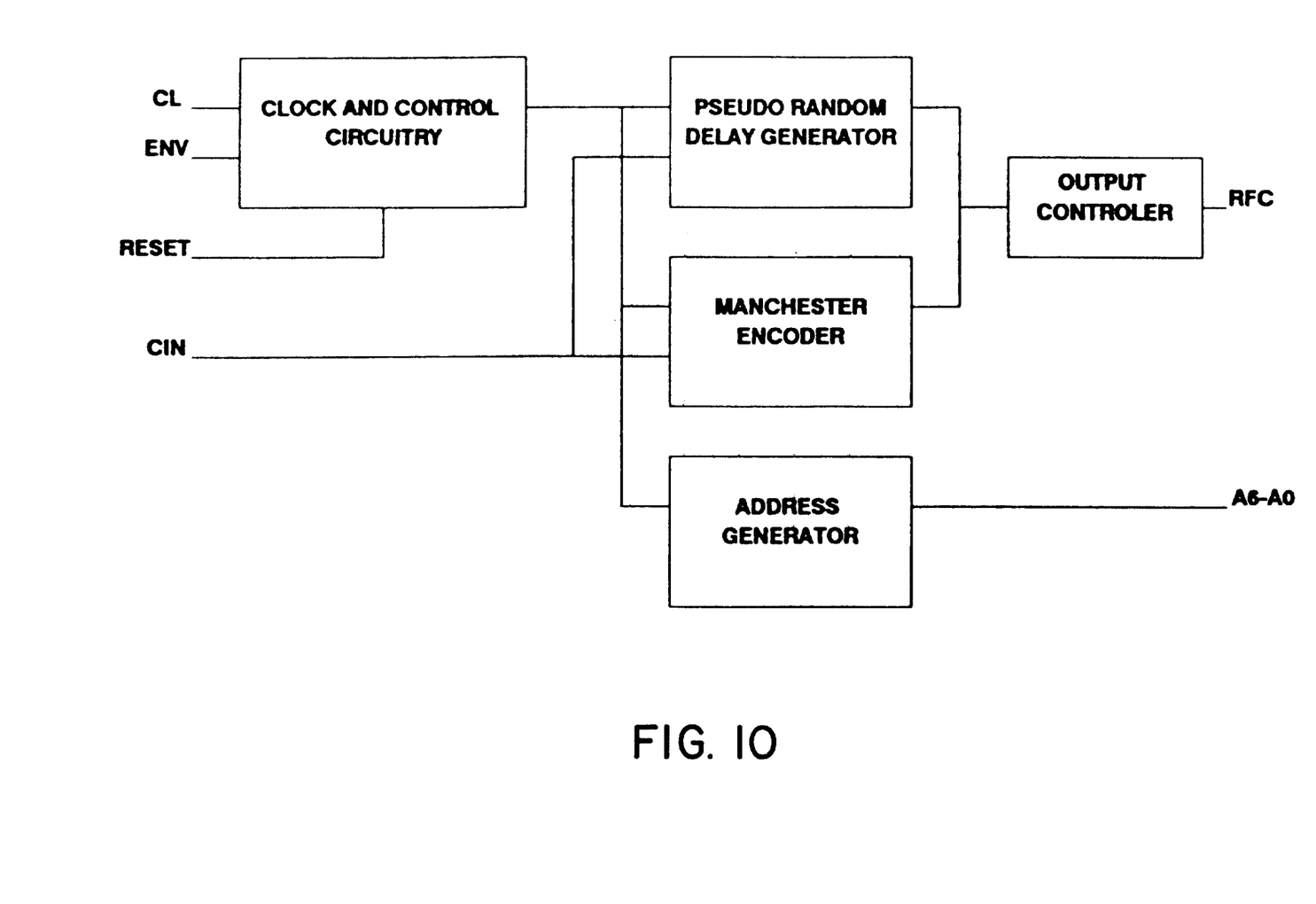
FIG. 10 is a functional block diagram of an integrated circuit employed in the transponder.
Figure 11:
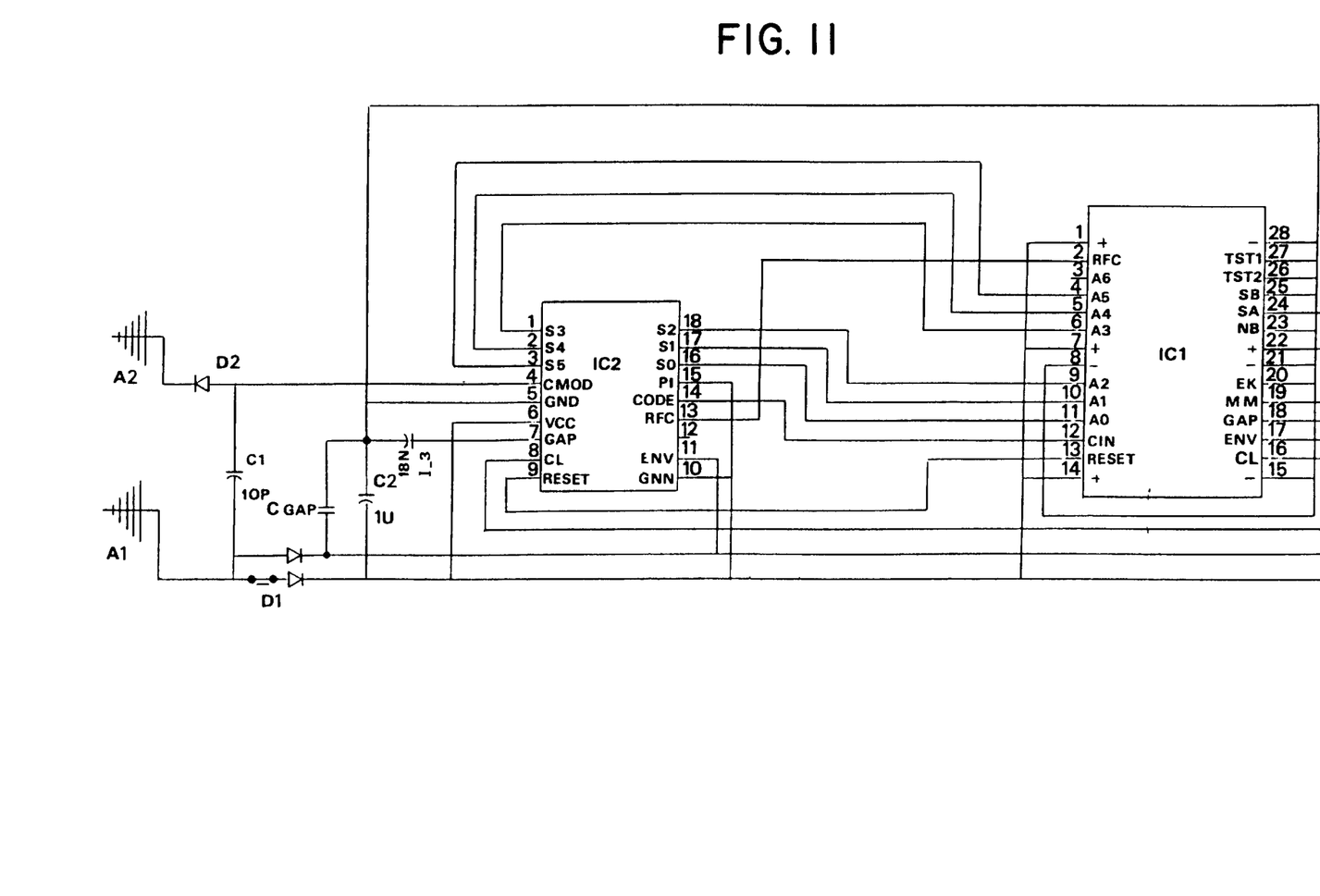
FIG. 11 is a circuit diagram of an embodiment of the transponder.

FIG. 10 is a functional block diagram of the integrated circuit IC1(50) which comprises clock and control circuitry 56, pseudo random delay generator 58, Manchester encoder 60, address generator 62 and output controller 64, and FIG. 11 illustrates one possible implementation of a transponder using the two integrated circuits. In FIG. 11, a capacitor $C_{gap}$ (54) is provided for systems in which the transponder waits for a "gap" or quiet period before responding to an interrogation signal.

Figure 12:
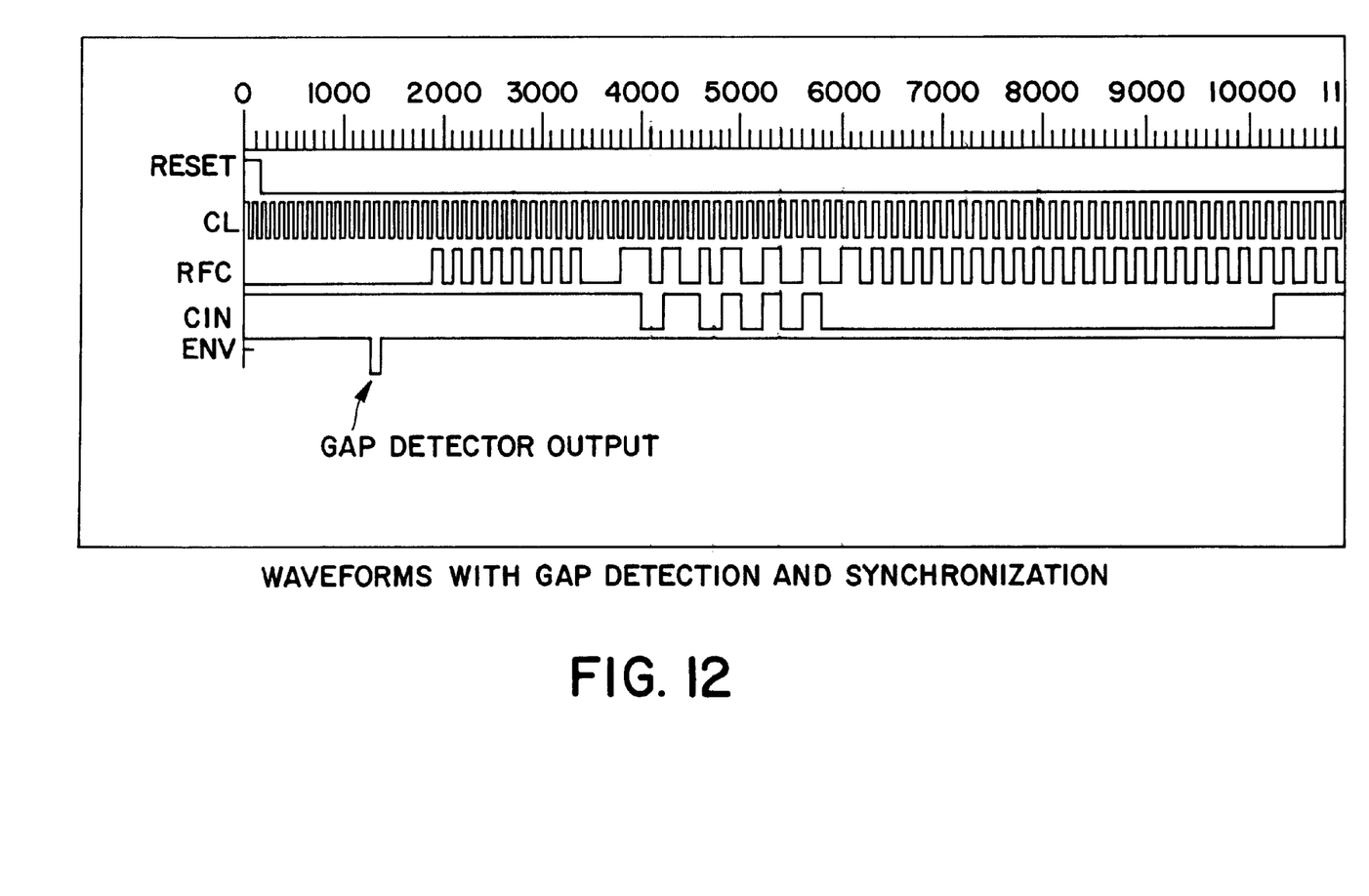
FIGS. 12 and 13 are typical waveforms generated by the transponder and interrogator.
Figure 13:
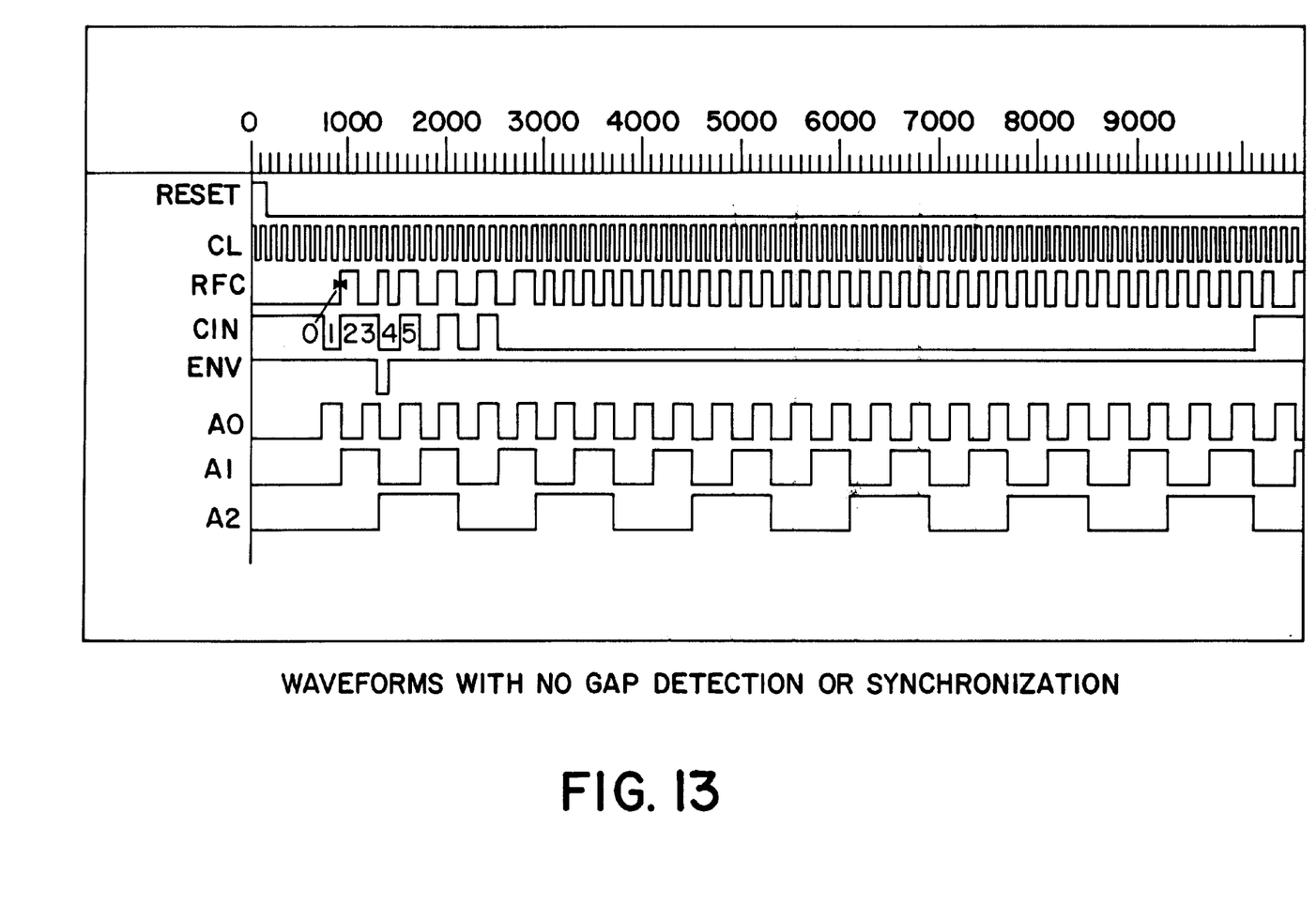

In FIG. 12, the RFC pulse train includes a set of synchronisation pulses 66, which can be omitted in applications where it is necessary to save time, or where the coding of the received signal is performed in software (see FIG. 13).

Figure 14:
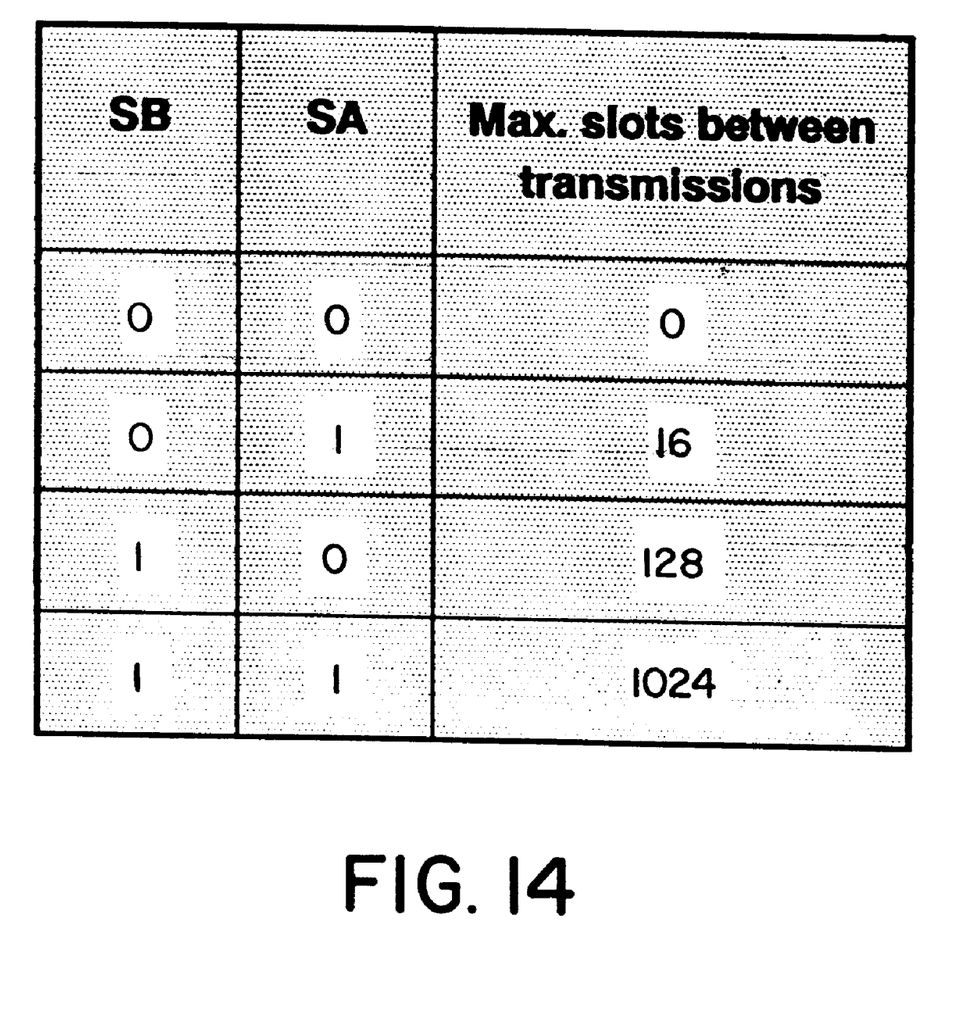
FIG. 14 is a table showing the response of the integrated circuit of FIG. 10 to different control signals.

On start-up of the integrated circuit IC1, the memory device (IC2) is addressed and the Manchester data sequence is transmitted. The internal pseudo random number generator of the chip IC2 is loaded with the last 16 bits of the data in the memory device, which determine a pseudo random time interval before the Manchester sequence is transmitted again. The maximum length of the interval is a multiple of the length of the time taken to transmit one Manchester sequence. The integrated circuit IC1 has a number of control pins which allow its operation to be modified as required. The pins SA and SB (see FIG. 11) control the time interval between data transmission, in accordance with the table of FIG. 14. In FIG. 14, each "slot" referred to in the third column of the table is equal to the length of a single Manchester sequence transmission.

Start-up of the integrated circuit IC1 can be initiated in one of two ways, determined by the status of the pin GAP. In the first mode, operation starts as soon as the RESET pin goes low, while in the second mode, operation starts after the RESET pin goes low and a rising edge is presented to the ENV pin. This is used to delay transmission from the transponder until a low-going pulse has been presented to the ENV pin by the logic circuit 42, which provides the "gap detection" or "quiet period" detection function referred to above.

The status of the pin MM determines the appearance of the Manchester sequence. If the pin MM is high, the data in the memory device is transmitted as a simple sequence of Manchester bits with no synchronisation pulses. With the pin MM low, the Manchester sequence starts with eight Manchester 0's for synchronisation and a command synchronisation sequence before transmitting the data bytes. The pin EK, when high, enables the termination of transmission after three transmissions of the Manchester sequence. If the pin EK is held low, transmission continues until the integrated circuit is powered down or reset. The status of the pin NB determines the length of the sequence that is transmitted. If the pin NB is held low, addressing for 64 bits is provided and 64 bits are transmitted. With the pin NB held high, 128 bits are addressed and transmitted. Both integrated circuits are designed to operate at low voltages of 2 V or less, and to draw low currents of less than 1 mA.

We claim:

1. An identification system comprising:
   an interrogator; and
   a plurality of transponders wherein:
      the interrogator comprises:
         a transmitter for transmitting an interrogation signal to the transponders,
         a receiver for receiving response signals from the transponders,
         a processor for identifying the transponders from data in the response signals, and
         means for confirming that a valid code from any one of the transponders is received and for modifying the interrogation signal to indicate confirmation of the valid code, the modifying of the interrogation signal being in response to and just after successful identification of the one of the transponders and being for a predetermined period after successfully identifying the one of the transponders, the predetermined period of time being shorter than a length of a transponder transmission;
      each of the transponders comprises:
         a receiving antenna for receiving the interrogation signal,
         a code generator,
         a transmitting antenna,
         a modulator connected to the code generator, so that upon receipt of the interrogation signal the transponder transmits a response signal containing data which identifies the transponder,
         means for repeating a transmission of the response signal at random or pseudo-random intervals to increase a probability of successful reception thereof by the interrogator, and
         means for sensing a modification in the interrogation signal and ceasing transmission of the response signal in response thereto.

2. An identification system according to claim 1, wherein the transponder further comprises means for controlling the transmission of the response signal, the means for controlling including means for producing repeated transmissions of the response signal at predetermined intervals.

3. An identification system according to claim 2, wherein the predetermined intervals are random or pseudo-random in length.

4. An identification system according to claim 3, wherein a length of the random or pseudo-random intervals is derived from data identifying the transponder.

5. An identification system according to claim 1, wherein the interrogator includes means for transmitting a code identifying a predetermined transponder or a category of transponders, each of the transponders including circuitry for enabling the transponder only on receipt of the code corresponding thereto.

6. An identification system according to claim 1, wherein the modulator of each respective one of the transponders is arranged to divert a portion of energy of the received interrogation signal to the transmitting antenna and on receipt of the interrogation signal the transponder transmits the response signal comprising a carrier derived from the interrogation signal which is modulated by an output of the code generator.

7. An identification system according to claim 6, wherein the interrogator further comprises:
   a mixer for mixing a reference signal derived from the interrogation signal with the received response signal from the transponder; and
   a filter for extracting a difference signal from a mixer output which contains the data from the response signal.

8. A transponder comprising:
   a receiving antenna for receiving an interrogation signal;
   a code generator;
   a transmitting antenna;
   a modulator connected to the code generator;
   means for transmitting a response signal containing data which identifies the transponder; and
   means for controlling a transmission to cause the transmission of a response signal to be repeated at random or pseudo-random intervals to increase a probability of successful reception thereof by an interrogator, the means for controlling being responsive to a modification of the interrogation signal for ceasing transmission of the response signal in response to the modification of the interrogation signal, the modification of the interrogation signal being in response to and just after successful identification of the transponder and being for a predetermined period of time being shorter than a length of a transponder transmission.

9. A transponder according to claim 8, wherein the modulator is arranged to divert a portion of energy of the received interrogation signal to the transmitting antenna, and upon receipt of the interrogation signal, the transponder transmits the response signal comprising a carrier derived from the interrogation signal which is modulated by an output of the code generator.

10. A transponder according to claim 9, wherein the means for controlling is arranged to monitor the received interrogation signal and to disable the modulator on receipt of a predetermined confirmation signal from the interrogator confirming that a valid code of the transponder has been received by the interrogator.

11. A transponder according to claim 10, wherein the means for controlling includes means for detecting the modification of the interrogation signal for the predetermined period.

12. A transponder according to claim 8, further including a charge storage device arranged to store a portion of energy of the interrogation signal, at least the code generator being arranged to be powered by the charge storage device while in operation.

13. A transponder according to claim 10, wherein the means for controlling further includes means for monitoring the received interrogation signal for a predetermined code, and means for enabling the modulator only on receipt of the predetermined code.

14. A transponder according to claim 8, wherein at least one of the receiving and the transmitting antenna is formed on a substrate.

15. A transponder according to claim 14, wherein the at least one of the receiving antenna and the transmitting antenna is formed by printing on the substrate with a conductive material.

16. A transponder according to claim 8, wherein the means for controlling includes means for producing repeated transmission of the response signal at predetermined intervals.

17. A transponder according to claim 8, wherein the control means includes means for monitoring the received interrogation signal and means for enabling transmission of the response signal only after an interruption of the interrogation signal for a predetermined duration.

18. An interrogator for identifying a plurality of transponders, comprising:
   a transmitter for transmitting an interrogation signal to the transponders;
   a receiver for receiving response signals from the transponders, the response signals from the transponders being repeated at random or pseudo-random intervals;
   a processor for identifying a transponder from data in the response signal; and
   means for modifying the interrogation signal to indicate that a valid code of any one of the transponders is received by the interrogator, the modifying of the interrogation signal being in response to and just after successful identification of the transponder and being for a predetermined time after successfully identifying the one of the transponders, the predetermined time being shorter than a length of a transponder transmission.

19. An interrogator as claimed in claim 18, wherein the interrogation signal is modulated with a code corresponding to data stored in at least one of the transponders.

20. A transponder for use with an interrogator, the interrogator comprising: a transmitter for transmitting an interrogation signal to a plurality of transponders, the interrogation signal being modulated with a code corresponding to data stored in at least one of the transponders; a receiver for receiving response signals from the transponders, the response signals from the transponders being repeated at random or pseudo-random intervals; a processor for identifying a transponder from data in the response signal; means for modifying the interrogation signal to indicate that a valid code of any one of the transponders is received by the interrogator, the modifying of the interrogation signal being in response to and just after successful identification of the transponder and being for a predetermined time after successfully identifying the one of the transponders, the predetermined time being shorter than a length of a transponder transmission, the transponder comprising:
   means for sensing a modification of the interrogation signal.

21. A transponder as claimed in claim 20, wherein the transponder further comprises means for determining the code in the interrogation signal and means for transmitting the response signal if the transmitted code and a stored data correspond.

22. An integrated circuit for use in a transponder, comprising:
   means for generating a response signal at random or pseudo-random intervals, in response to an interrogation signal, the response signal containing data which identifies the transponder; and
   means for controlling arranged to cause repeated generation of the response signal, the means for controlling being responsive to a modification in the interrogation signal for ceasing generation of the response signal in response to the modification of the interrogation signal, the means for controlling including means for detecting a modification of the interrogation signal of a predetermined period, the modification of the interrogation signal being in response to and just after successful identification of the transponder and the predetermined period being shorter than a length of a transponder transmission.

23. An integrated circuit according to claim 22, including a charge storage portion arranged to store a portion of energy of the interrogation signal.

24. An integrated circuit according to claim 22, wherein the means for controlling further includes means for monitoring the received interrogation signal for a predetermined code, and means for enabling the means for controlling only on receipt of the predetermined code.

25. An integrated circuit according to claim 24, wherein the means for controlling further includes means for monitoring the received interrogation signal and means for enabling generation of the response signal only after an interruption of the interrogation signal for a predetermined duration.

* * * * *